United States Patent [19]
Reich et al.

[11] Patent Number: 5,035,674
[45] Date of Patent: Jul. 30, 1991

[54] MACHINE FOR CUTTING WINGS OF SKATE FISH

[75] Inventors: Robert R. Reich, Odessa, Mo.; Jan Olesen, Warwick, R.I.

[73] Assignee: Triple R. Designs, Inc., Odessa, Mo.

[21] Appl. No.: 532,669

[22] Filed: Jun. 4, 1990

[51] Int. Cl.⁵ .......................................... A22C 25/16
[52] U.S. Cl. .................... 452/169; 452/166; 452/170
[58] Field of Search ............... 17/53, 52, 11, 57, 56; 452/166, 149, 169, 170

[56] References Cited
U.S. PATENT DOCUMENTS

| | | | |
|---|---|---|---|
| 2,234,431 | 3/1941 | Faulkner | 17/53 |
| 2,521,640 | 9/1956 | Laurin | 17/56 |
| 2,704,378 | 3/1955 | Schlichting | 17/56 |
| 3,964,132 | 6/1976 | Backhaus et al. | 17/57 |
| 4,542,559 | 9/1985 | Brower | 17/46 |
| 4,562,613 | 1/1986 | Lewis | 17/11 |
| 4,597,136 | 7/1986 | Hazenbroek | 17/52 |
| 4,811,462 | 3/1989 | Meyn | 17/62 |

Primary Examiner—Willis Little
Attorney, Agent, or Firm—Hovey, Williams, Timmons & Collins

[57] ABSTRACT

Apparatus (10) for the rapid, assembly-line severing of wing sections from marine creatures such as skates or rays is provided which minimizes manual labor and collects severed wing sections for further processing. The apparatus (10) is provided with a wing severing station (12) having a pair of powered, relatively laterally adjustable wing-severing blades (70, 72) along with a central, pivotally mounted, fish-engaging hold down assembly (30). Severed wings are directed via appropriate diverters (122, 124, 126) onto a conveyor (118) for further processing, while the central fish carcasses are collected via a chute (132).

9 Claims, 5 Drawing Sheets

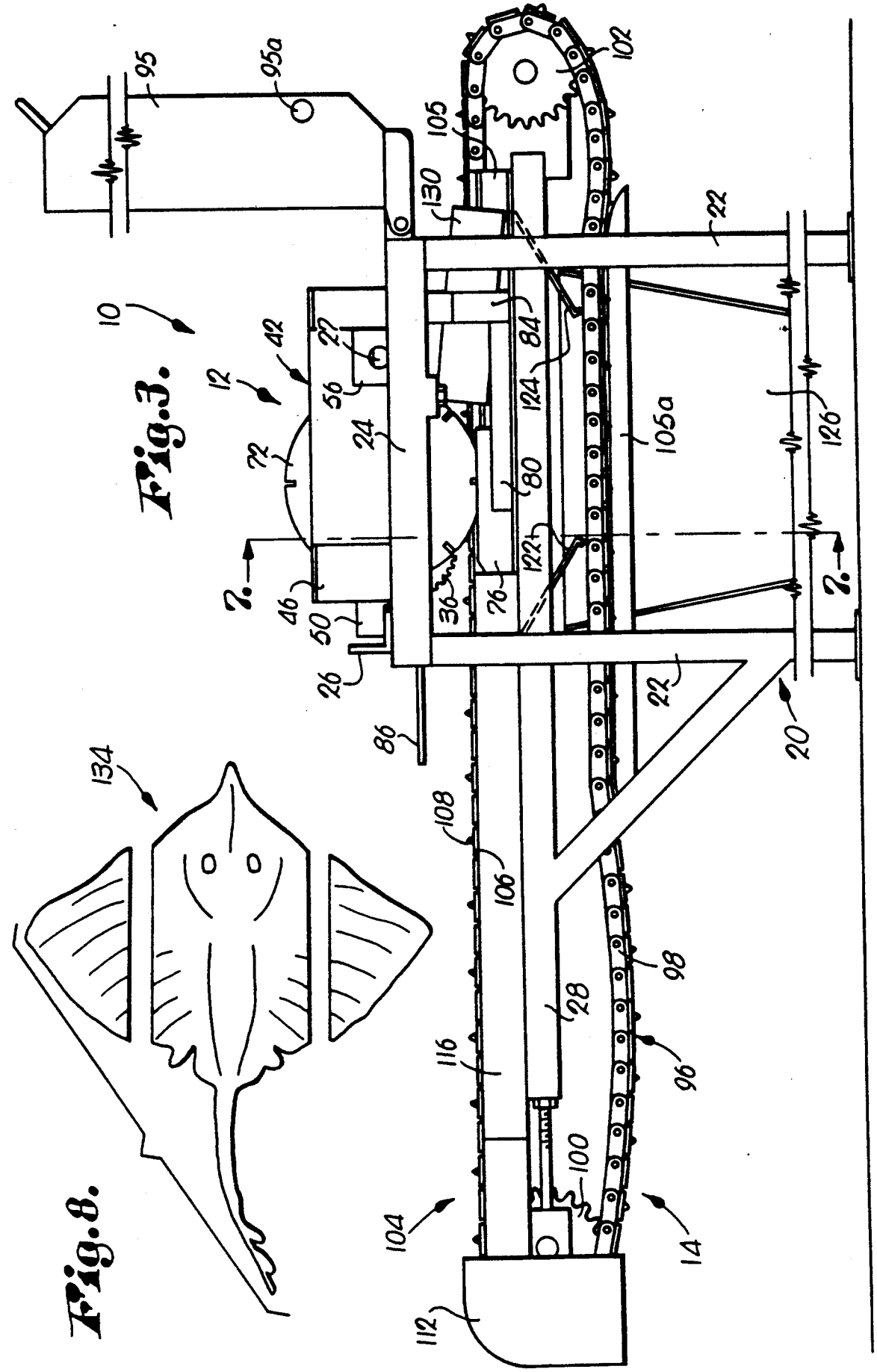

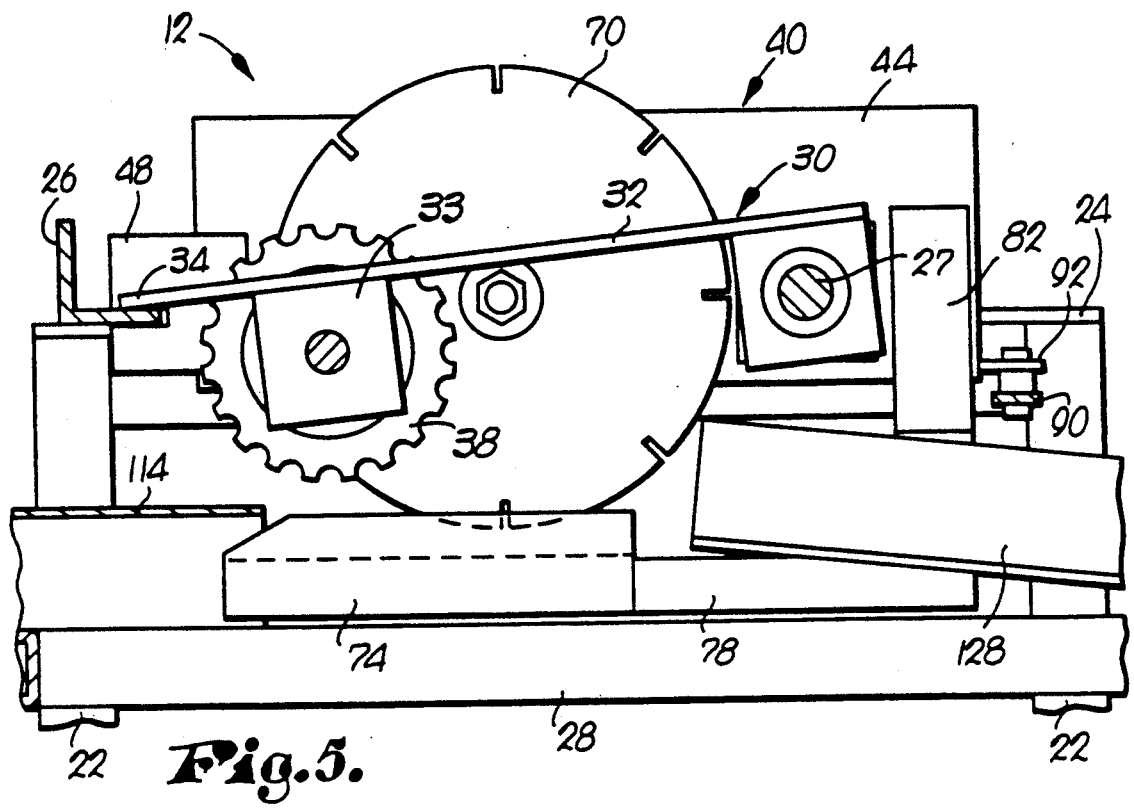
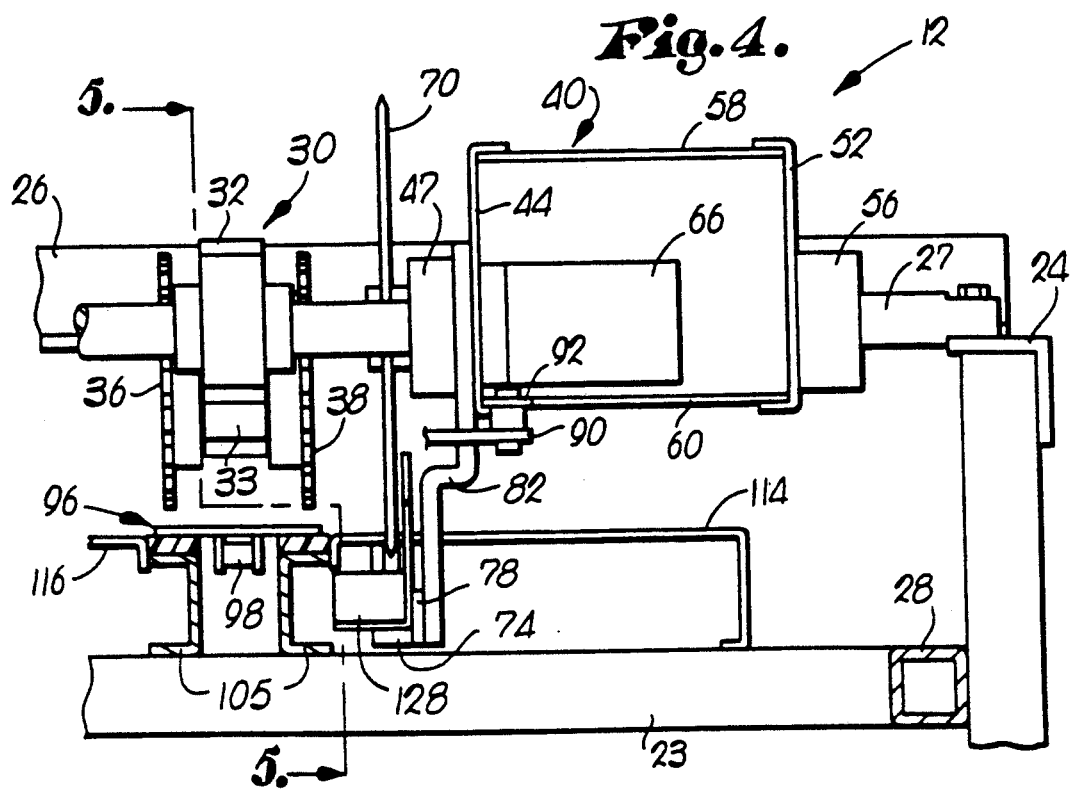

MACHINE FOR CUTTING WINGS OF SKATE FISH

BACKGROUND OF THE INVENTION

1. Field of the Invention

The present invention is broadly concerned with an improved apparatus for the efficient severing of wing sections from marine creatures such as skates or rays which minimizes the amount of manual labor required, collects the severed wing sections for further processing, and provides for easy disposal of the head and body portions of processed fish. More particularly, it is concerned with such an apparatus preferably having a pair of weighted, rotatable, serrated hold-down sprockets designed for engaging and holding fish of various sizes during cutting operations, together with a pair of outboard, selectively adjustable, powered wing severing blades; a wing section conveyor extending beneath the cutting section serves to collect and convey the wing sections for additional processing, while a carcass chute is employed for collection and disposal of head and body portions.

2. Description of the Prior Art

In recent years, economic benefit has been derived from the processing of marine creatures such as skates or rays. In particular, the flattened wing sections of such fish have proven to be a delicacy, and accordingly processors have sought a means of efficiently handling fish of this type and preparing the wing sections thereof for sale. The obvious expedient of simply manually severing the wing sections is both labor intensive and wasteful, inasmuch as not all of the valuable wing sections may be obtained.

There is accordingly a decided need in the art for a mechanized, assembly line-type device for cleanly and efficiently severing fish wing sections with a minimum of manual labor and fish handling.

SUMMARY OF THE INVENTION

The present invention overcomes the problems outlined above and provides a greatly improved fish wing severing assembly which can process significantly more poundage of fish per unit time than conventional manual processing. To this end, the apparatus of the invention includes means for supporting and moving a fish having wing sections towards and into a severing station, with the latter having both means for holding the fish in place during severing operations, and a pair of laterally spaced apart severing elements. Severed wing sections fall by gravity and are collected on an underlying conveyor which transports the severed sections away from the apparatus for additional processing. In preferred forms, the fish-holding means is in the form of a pair of central, rotatable, up and down pivotal serrated sprockets adapted for accommodating fish of varying sizes. On the other hand, the severing elements are advantageously in the form of outboard, powered, rotatable knives which can be selectively adjusted to alter the lateral spacing there between.

In particularly preferred forms, the fish-engaging sprockets are supported on an elongated, fore and aft extending bar member, the latter being mounted for pivotal up and down movement thereof about an axis generally parallel with the axes of rotation of the sprockets. In addition, the bar member and sprockets have sufficient mass to bear upon and hold a fish during wing severing operations.

The preferred wing severing knives are laterally adjustable by means including a pivotal adjustment lever coupled by linkage means to each of the knives; pivoting of the lever in turn causes relative movement of the knives toward or away from each other.

BRIEF DESCRIPTION OF THE DRAWINGS

FIG. 3 is a side view of the apparatus with parts broken away for clarity and with certain parts in phantom;

FIG. 4 is an enlarged, fragmentary side view partially in phantom and with certain parts broken away, illustrating the wing severing section;

FIG. 5 is a sectional view taken along line 5—5 of FIG. 4;

FIG. 8 is a view illustrating a skate fish with wing sections severed therefrom.

DESCRIPTION OF THE PREFERRED EMBODIMENT

Figure 1:
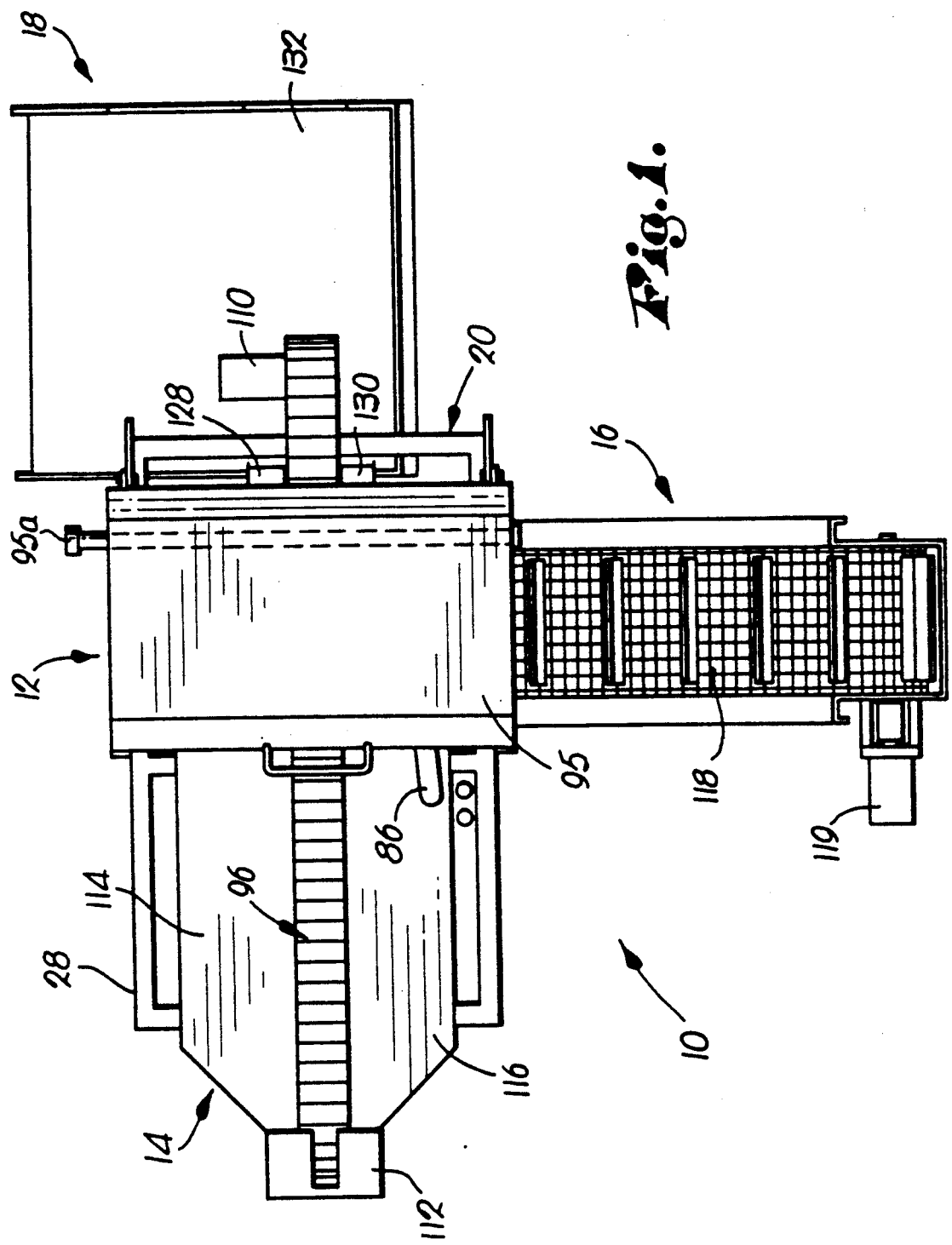
FIG. 1 is a plan view of the preferred wing severing apparatus in accordance with the invention.

Turning now to the drawings, a fish wing section severing device 10 is illustrated in plan in FIG. 1 and includes a wing severing section 12, input conveyor assembly 14, severed wing section recovery conveyor 16 and carcass collection and removal assembly 18.

In more detail, the station 12 includes an upright frame assembly 20 including ground-engaging uprights 22, fore an aft extending rails 24, transverse rail 23, an uppermost, laterally extending guide angle 26 and a rigid, cylindrical guide shaft 27. In addition, a forwardly extending, rectangular support frame 28 is secured to and extends from the opposite ends of frame assembly 20.

Figure 2:
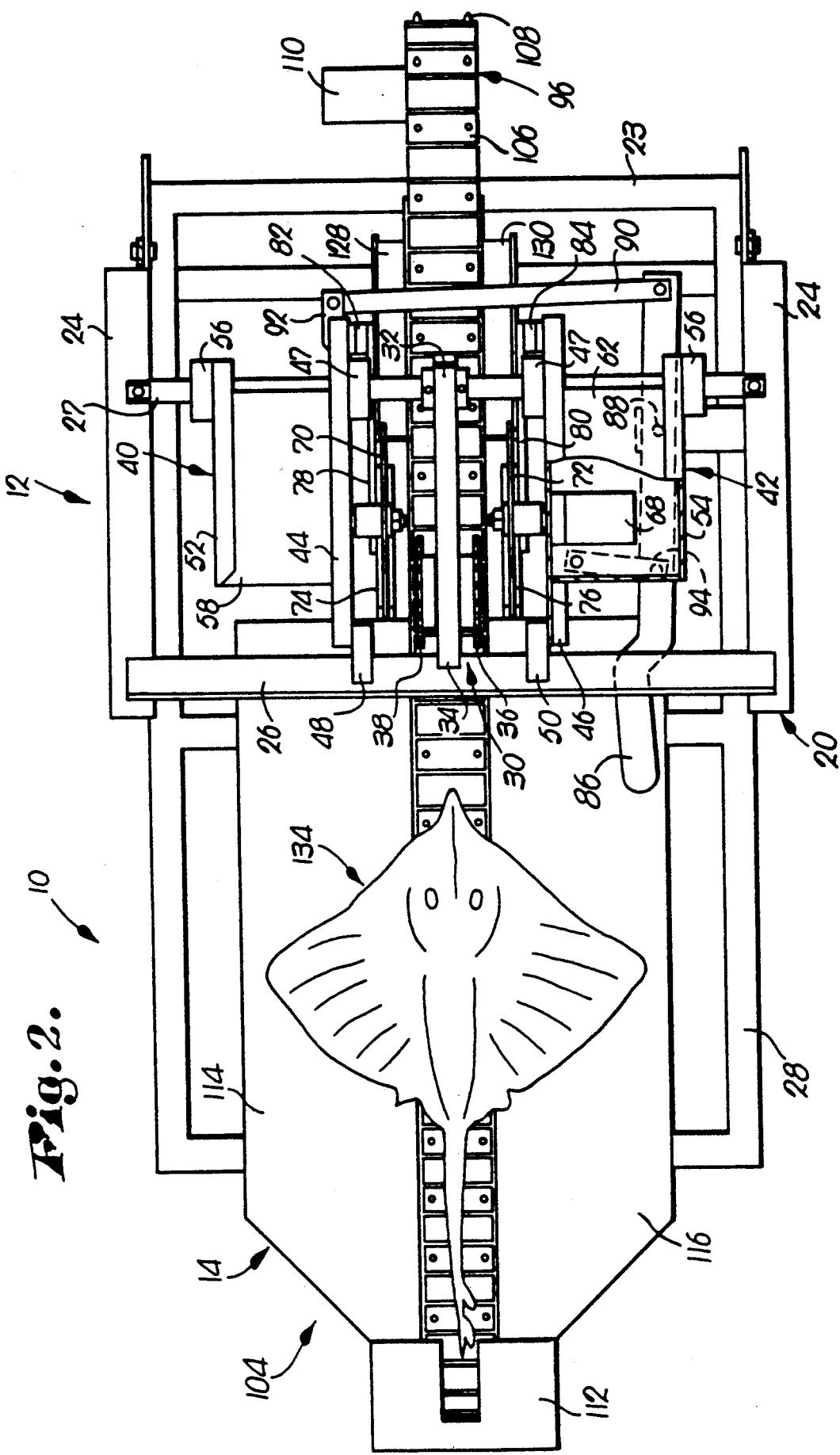
FIG. 2 is a plan view similar to that of FIG. 1, but illustrating the internal mechanisms of the wing severing station and showing a winged fish supported on the main conveyor.
Figure 6:
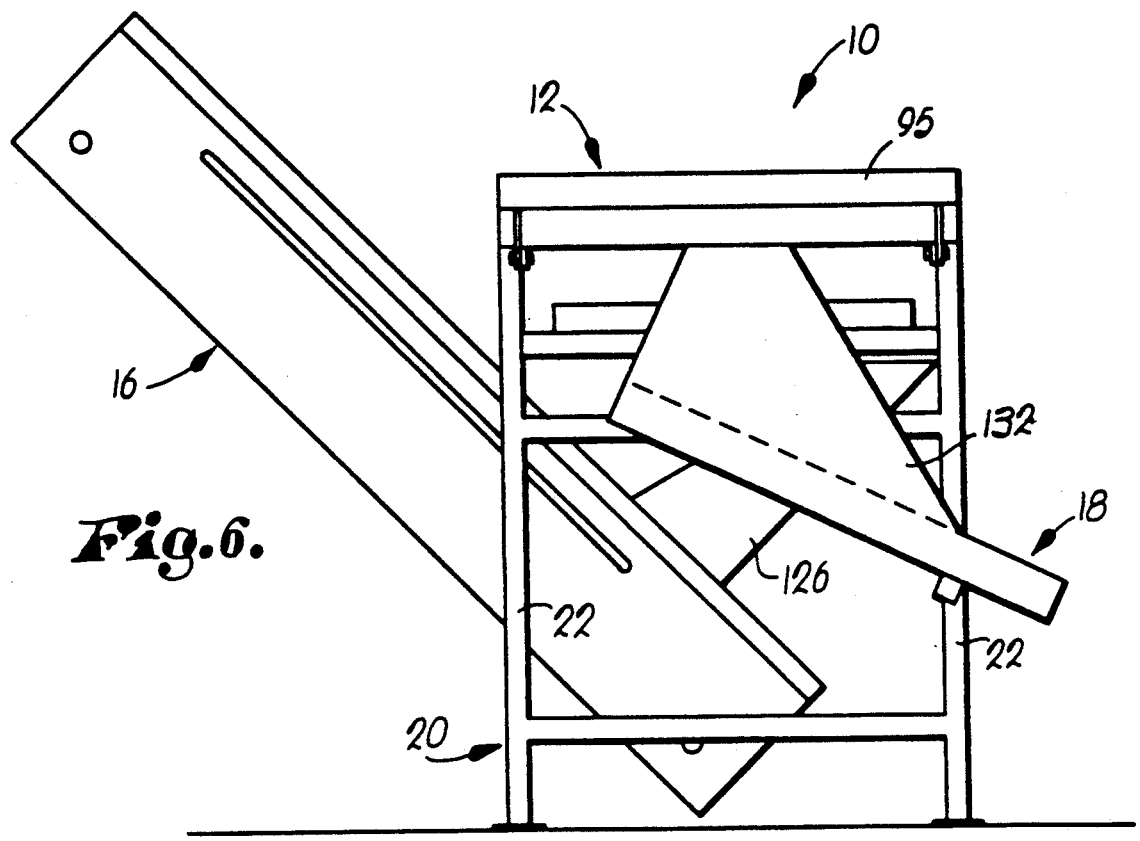
FIG. 6 is an end elevational view of the apparatus shown in FIG. 1, and depicting the severed wing conveyor and carcass chute.

A central fish-holding assembly 30 is also situated within station 12 and includes an elongated support bar 32 which is pivoted adjacent its rearward end to guide shaft 27. The forwardmost lip 34 of the bar 32 is adapted to slidingly engage guide angle 26 as best seen in FIG. 2. A pair of laterally spaced apart, coaxial, rotatable, peripherally serrated sprockets 36, 38 are secured a mounting block 33 affixed to the underside of bar 32 adjacent lip 34.

A pair of laterally spaced apart, opposed knife assemblies 40, 42 are situated in straddling relationship with the support bar 32 and sprockets 36, 38. Each of the assemblies 40, 42 includes a mounting plate 44, 46 slidably journaled on shaft 27 by means of slide bearings 47 and extending forwardly for engagement with guide angle 26. In particular, the forwardmost ends of the plates 44, 46 is equipped with a bifurcated, synthetic resin slide block 48, 50 which receives the horizontal stretch of angle 26 (see FIG. 3).

Figure 7:
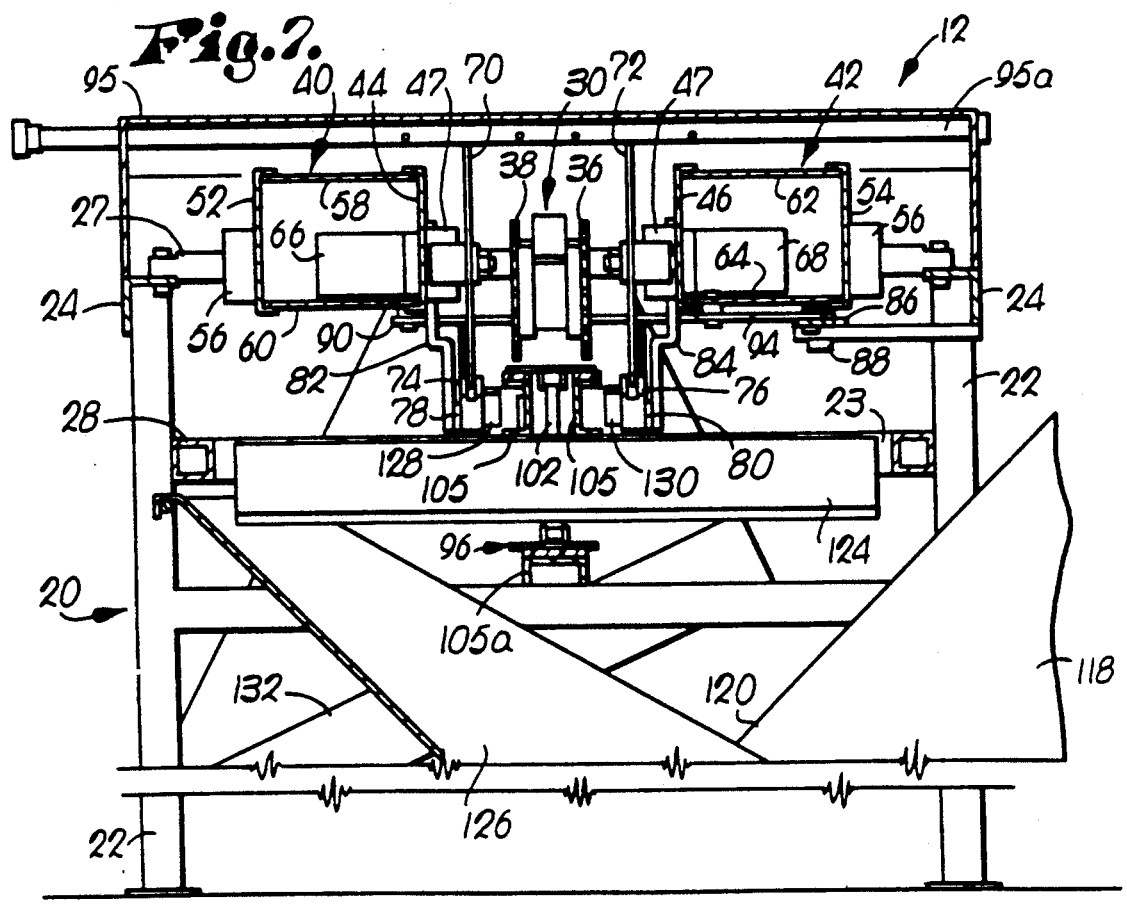
FIG. 7 is a sectional view taken along line 7—7 of FIG. 3.

Each knife assembly 40, 42 is also provided with an outboard, vertically oriented plate 52, 54 slidable on the shaft 27 by means of corresponding connected bearings 56. As best seen in FIG. 7, the plates 52, 54 are in spaced, opposed relationship to corresponding inboard plates 44, 46. A pair of upper and lower, transversely extending plates 58, 60 extend between the plates 44, 52; and a similar set of plates 62, 64 extend between and interconnect plates 46, 54. In this fashion, the described plates present a pair of elongated, fore and aft extending box-like structures. A hydraulic motor 66, 68 forms a part of the respective knife assemblies 40, 42, with the individual motors being secured to a corresponding plate 44 or 46 (see FIG. 7). A rotatable cutting blade 70 or 72 is operatively secured to each motor 66, 68 for powered rotation of the cutting blades. It will be observed in this respect that the blades 70, 72 are located inboard of the associated plates 44, 46, but outboard of the sprockets 36, 38.

An elongated, slotted, lower guide block 74, 76 is positioned beneath each of the blades 70, 72, with the slots of the blocks 74, 76 receiving the lowermost peripheries of the associated blades. The blocks 74, 76 are supported by means of an elongated, rearwardly extending arm 78, 80, the latter being affixed to an upwardly extending dog leg bracket 82, 84 connected to the inboard face of the adjacent plate 44 or 46.

The individual knife assemblies, 40, 42 are relatively adjustable so as to vary the effective distance between the knife blades 70, 72. To this end, an elongated adjustment lever 86, pivotally supported as at 88, is positioned beneath assembly 42. A first, transversely extending, rearward link 90 is pivotally secured between the rearmost end of lever 86 and plate 44, the latter connection being effected by means of a pivotal mounting plate 92. The overall adjustment assembly further includes a short, transversely extending, forward link 94 pivotally connected between lever 86 and plate 46. As will be appreciated from a study of FIG. 2, pivoting movement of the lever 86 in turn effects corresponding inner and outward movement of the entire assemblies 40, 42, such movement being permitted by virtue of the bearings 47, 56 as well as the bifurcated slide blocks 48, 50.

A pivotally mounted cover 95 forms a part of station 12 and is adapted to surmount the operative mechanism thereof. Cover 95 also carries a transversely extending, apertured water delivery pipe 95a adjacent the upper and rearward extremity thereof; the purpose of this pipe 95a will be described hereinafter.

The input conveyor assembly 14 includes an elongated, endless, multiple-slat conveyor 96 supported on a conventional roller chain 98 and endmost sprockets 100, 102. As illustrated in FIG. 3, the conveyor 96 extends from a fish-loading station 104 into and through the severing station 12, with the uppermost stretch of the conveyor 96 being supported and guided upon elongated, laterally spaced rails 105, while the lower stretch is supported on guide member 105a. The alternating slats 106 of the conveyor 96 are advantageously provided with upstanding fish-engaging prongs 108. The conveyor 96 is powered by means of hydraulic motor 110 (see FIG. 2).

The fish-loading station 104 is provided with an endmost guard 112, and has a pair of forwardly extending, plate-like fish wing supports 114, 116 astride conveyor 96. The latter structure is supported on frame 28 as best seen if FIGS. 2 and 3.

The recovery conveyor 16 includes an elongated, obliquely oriented, conveyor 118 powered by motor 119 and having its lowermost wing-loading end 120 generally beneath the station 12. The purpose of conveyor 118 is to convey severed wing sections upwardly away from the station 12 for further processing. In order to ensure that severed wings are delivered to the lower end of conveyor 118, a pair of opposed wing guides 122, 124 are provided on opposite ends of the cutting assemblies 40, 42. In addition, a depending wing chute 126 is affixed to the frame assembly and extends downwardly beneath the guides 122, 124, so as to ensure that severed wing sections are positively directed onto the conveyor 118.

The carcass collection and removal assembly 18 is designed to efficiently remove the central or carcass section of processed fish from station 12, while eliminating the possibility that such carcasses are collected along with severed wings. The assembly 18 therefore includes a pair of short, fore and aft extending, slightly inclined supplemental guides 128, 130 located on opposite sides of the conveyor 96 rearward of the cutting blades 70, 72 (see FIGS. 2 and 5). In addition, the assembly 18 has a large diversion chute 132 positioned rearwardly of the station 12 and located so that carcasses carried by conveyor 96 fall off the conveyor and into the chute. As illustrated in FIG. 1, the supplemental guides 128, 130 are also oriented for ensuring that processed carcasses are directed into the chute 132. Of course, a collection bin (not shown) or other conventional means may be used to effect final disposition of the severed carcasses.

In the use of device 10, a fish 134 to be processed is first placed upon conveyor 96 in the manner illustrated in FIG. 2, with the conveyor moving the fish into and through the station 12. Upon entering the station 12, the hold down sprockets 36, 38 are first encountered, and, by virtue of the pivotal mounting thereof, these sprockets are lifted so as to accommodate the fish 134. It will be appreciated, however, that the weight of the sprockets 36, 38 and the associated structure serves to effectively hold the fish 134 during cutting operations. As the fish further proceeds through the station 12 the blades 70, 72 come into play in order to sever the lateral wings thereof. Such severed wings are illustrated in FIG. 8, along with the central carcass portion of the fish.

The severed fish wings then drop onto conveyor 118, and are guided in this respect by means of the guides 122, 124 and chute 126. Severed wings reaching the top of conveyor 118 are then collected by conventional means for further processing. The central carcass portion of the fish 134 passes through station 12 and falls onto chute 132. This result is ensured by provision of the supplemental guides 128, 130. As explained previously, the carcass portions are generally considered waste, and are handled accordingly.

In order to maintain the cleanliness of station 12, pressurized water may be continuously or intermittently passed through the pipe 95a so as to spray the interior of the wing severing station 12. Inasmuch as cover 95 may be pivoted open as viewed in FIG. 3, the station 12 may also be readily cleaned after use.

In the event that different sized fish are to be processed, the cutting assemblies 40, 42 may be repositioned as desired, through the medium of adjusting lever 86. In this fashion, the maximum amount of valuable wing section can be obtained from fish of varying sizes.

We claim:

1. Apparatus for severing the wing sections of fish having broad, flattened bodies such as skates, rays or the like, said apparatus comprising:

means for supporting and moving a fish having said wing sections toward and into a severing station;

means adjacent said severing station for holding said fish in place during severing operations, including structure for adjustment of said fish-holding means for accommodating fish of varying size said fish-holding means comprising a pair of laterally spaced apart, rotatable members;

a pair of laterally spaced apart severing elements respectively positioned outboard of said fish-holding means and oriented for severance of said wing sections during movement of the fish through said station; and means operatively coupled with said pair of elements for selective adjustment of the lateral spacing therebetween.

2. The apparatus as set forth in claim 1, including an elongated, fore and aft extending bar member supporting said sprocket members, said bar member being mounted for pivotal up and down movement thereof about an axis generally parallel with the axes of rotation of said sprockets, said bar member and sprockets having sufficient mass to bear upon and hold a fish during wing severing operations.

3. The apparatus as set forth in claim 1, including conveyor means disposed at least partially below said severing station for receiving severed wing sections and conveying the same away from said station.

4. The apparatus as set forth in claim 1, including means for collecting the central body portions of said fish after severance of said wing sections therefrom.

5. The apparatus as set forth in claim 1, said element-adjusting means comprising a pivotal adjustment lever, linkage means operatively coupling said lever with each of said elements respectively for relative movement of the elements toward or away from each other upon pivoting of the lever.

6. The apparatus as set forth in claim 1, said fish supporting and moving means comprising and endless conveyor, at least a portion of said conveyor being situated within said station and beneath said fish-holding means and elements.

7. The apparatus as set forth in claim 6, said conveyor presenting a fish-engaging surface, said surface being equipped with a plurality of upstanding fish-securing prongs.

8. The apparatus as set forth in claim 1, said elements comprising circular, axially rotatable knives, there being means operatively coupled with said knives for powered rotation thereof.

9. The apparatus as set forth in claim 1, including means adjacent said station for spraying rinse water within the confines of the station.

* * * * *